(12) United States Patent
Fujikawa

(10) Patent No.: US 10,521,887 B2
(45) Date of Patent: Dec. 31, 2019

(54) IMAGE PROCESSING DEVICE AND IMAGE PROCESSING METHOD

(71) Applicant: FUJIFILM Corporation, Tokyo (JP)

(72) Inventor: Tetsuya Fujikawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 136 days.

(21) Appl. No.: 15/918,137

(22) Filed: Mar. 12, 2018

(65) Prior Publication Data

US 2018/0232862 A1    Aug. 16, 2018

Related U.S. Application Data

(63) Continuation of application No. PCT/JP2016/075456, filed on Aug. 31, 2016.

(30) Foreign Application Priority Data

Sep. 29, 2015  (JP) ................................ 2015-191762

(51) Int. Cl.
   *G06T 5/00*    (2006.01)
(52) U.S. Cl.
   CPC .... *G06T 5/002* (2013.01); *G06T 2207/20182* (2013.01)
(58) Field of Classification Search
   CPC ................ G06T 5/002; G06T 2207/20182
   See application file for complete search history.

(56) References Cited

U.S. PATENT DOCUMENTS

| 8,340,461 | B2   | 12/2012 | Sun et al. |
| 9,177,363 | B1 * | 11/2015 | Huang ............... G06T 5/003 |
| 9,508,126 | B2 * | 11/2016 | Yang ................. G06T 5/10 |
| 2011/0188755 | A1 | 8/2011 | Bratkovski et al. |

(Continued)

FOREIGN PATENT DOCUMENTS

| JP | 2012-221237 A | 11/2012 |
| WO | WO 2014/077126 A1 | 5/2014 |

OTHER PUBLICATIONS

Japanese Decision to Grant a Patent, dated May 29, 2018, for corresponding Japanese Application No. 2017-543043, with an English machine translation.

(Continued)

*Primary Examiner* — Leon Flores
(74) *Attorney, Agent, or Firm* — Birch, Stewart, Kolasch & Birch, LLP

(57) ABSTRACT

The present invention provides an image processing device and an image processing method capable of removing haze (reducing the effect of haze) without losing detail of a high-luminance subject. In the aspect of the present invention, the input image I is represented by $I = J \cdot t + A \cdot (1-t)$ where an original image is J, an atmospheric light pixel value is A, and a transmittance is t. In this case, a dark channel value D of each pixel of the input image I is calculated, and is associated with the transmittance t having a value monotonically decreasing for each pixel of which D ranges from 0 to 1 and associated with the transmittance t having a value monotonically increasing for each pixel which corresponds to haze and of which D ranges from 1 to Dmax. In such a manner, the original image J is generated as a corrected image.

15 Claims, 11 Drawing Sheets

(56) References Cited

U.S. PATENT DOCUMENTS

| | | | | |
|---|---|---|---|---|
| 2011/0188775 | A1* | 8/2011 | Sun | G06K 9/40 |
| | | | | 382/274 |
| 2015/0279003 | A1* | 10/2015 | Higaki | G06K 9/4661 |
| | | | | 382/254 |
| 2015/0304524 | A1 | 10/2015 | Toda | |
| 2015/0332437 | A1* | 11/2015 | Kondou | G06T 5/00 |
| | | | | 382/190 |
| 2016/0071244 | A1* | 3/2016 | Huang | G06T 5/002 |
| | | | | 382/263 |
| 2016/0078605 | A1* | 3/2016 | Huang | G06T 5/003 |
| | | | | 382/167 |

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2016/075456, dated Apr. 12, 2018, with an English translation of the Written Opinion.

International Search Report (Form PCT/ISA/210) for International Application No. PCT/JP2016/075456, dated Nov. 15, 2016, with an English translation.

* cited by examiner

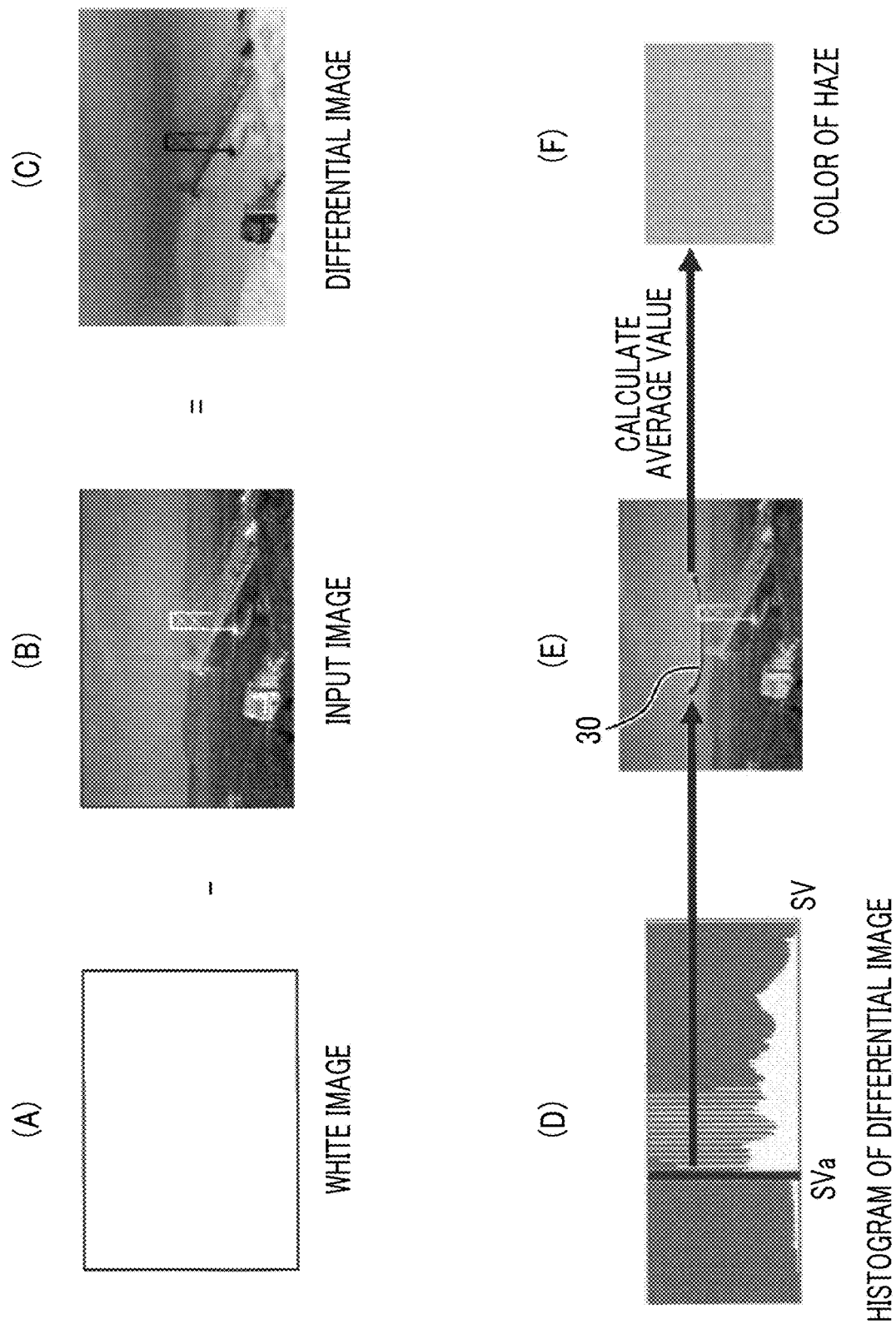

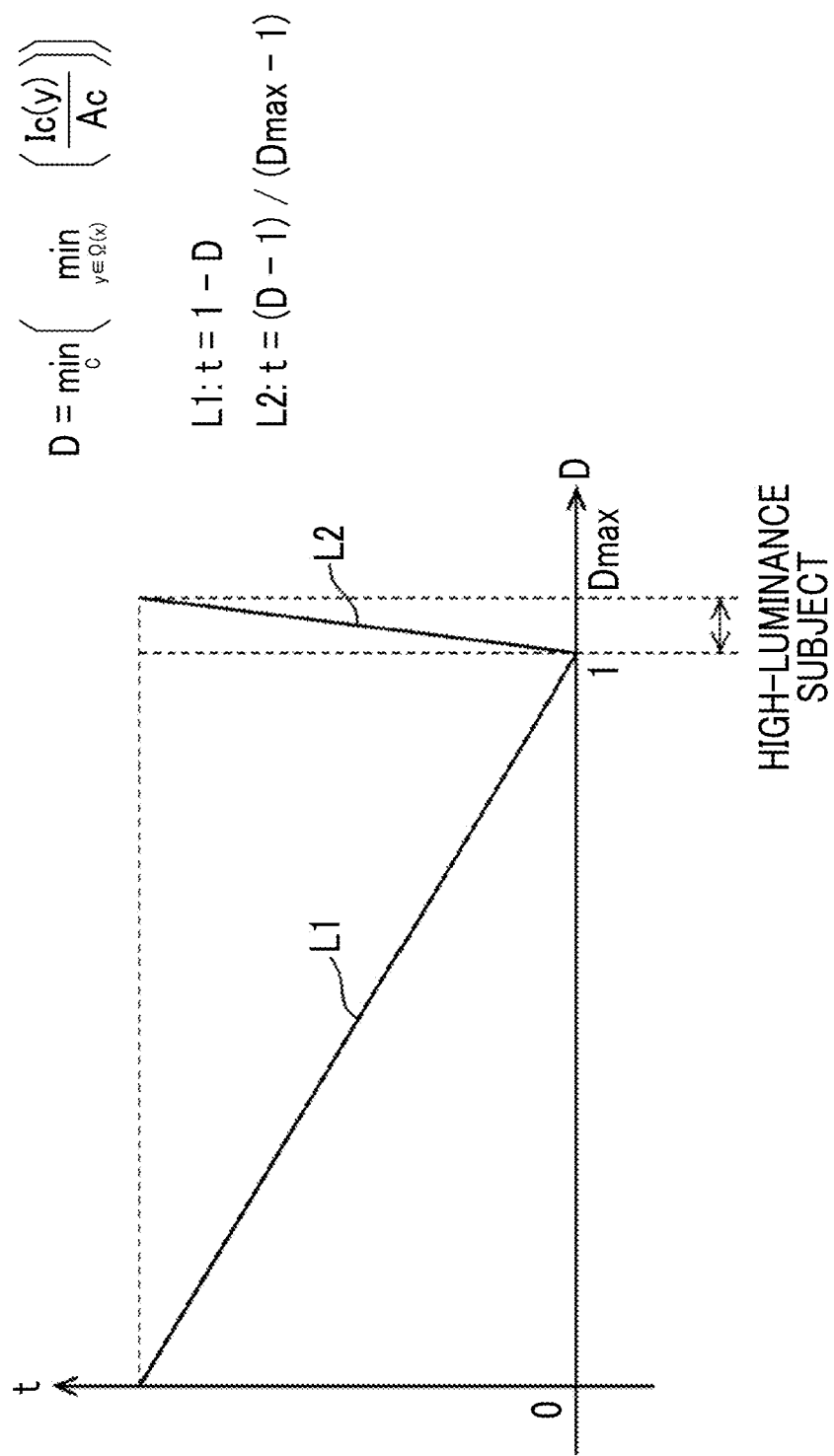

IMAGE PROCESSING DEVICE AND IMAGE PROCESSING METHOD

CROSS-REFERENCE TO RELATED APPLICATIONS

The present application is a Continuation of PCT International Application No. PCT/JP2016/075456 filed on Aug. 31, 2016 claiming priority under 35 U.S.C § 119(a) to Japanese Patent Application No. 2015-191762 filed on Sep. 29, 2015. Each of the above applications is hereby expressly incorporated by reference, in their entirety, into the present application.

BACKGROUND OF THE INVENTION

1. Field of the Invention

The present invention relates to an image processing device and an image processing method, and relates to an image processing device and an image processing method capable of removing haze such as mist or fog included in an image.

2. Description of the Related Art

In an image captured with a camera, a scene may be whitened due to haze such as mist or fog, haze is superimposed on an image (hereinafter referred to as an original image) in which original colors of a subject as an imaging target are directly reflected, and in some cases, visibility of the subject may deteriorate due to deterioration in contrast, and an increase in luminance of the entire image, and the like.

There is a known technique called the dark channel prior as an image processing technique for removing haze from an image including such haze (hereinafter referred to as an uncorrected image or an input image) (refer to, for example, U.S. Pat. No. 8,340,461B, etc.).

The dark channel prior is a method based on empirical fact that an intensity value of any of the R, G, and B color channels shows an extremely small value (normally close to 0) in at least one pixel in a local region, in most of images without haze, particularly, outdoor images. Then, from this, it is understood that the minimum value of the intensity values of the color channels of each pixel in each local region in the uncorrected image including haze indicates the magnitude of the degree of effect of haze in each local region, and the haze is removed through a process of making the magnitude of the degree of effect of haze in each local region become zero.

SUMMARY OF THE INVENTION

In order to appropriately remove haze by the dark channel prior, it is a premise that the intensity value of one color channel of at least one pixel in the local region shows a value close to 0 in the image without haze (original image) as described above.

However, in a case where a high-luminance subject (image range) is present in the original image, in a local region within the high-luminance image range, strong intensity values may be exhibited in all the color channels of all the pixels.

Correction for haze removal may be also performed on the high-luminance image range in the uncorrected image, in which such an original image and haze are superimposed, through the dark channel prior processing in a manner similar to that of the other image range. In this case, as can be seen from the above description, in the high-luminance image range, processing is performed such that the degree of effect of haze on the original image is not correctly obtained, and the degree of effect of haze is extremely large regardless of the actual degree of effect, and the degree of effect of the original image is extremely small.

At that time, in a case where haze is intended to be removed, there was a problem that the high-luminance image range is saturated in the corrected image, and the detail (fine change of luminance and color) thereof is lost.

The present invention has been made in consideration of the above-mentioned situations, and its object is to provide an image processing device and an image processing method capable of removing haze (reducing the effect of haze) without losing detail of a high-luminance subject.

In order to achieve the above-mentioned object, an image processing device according to one aspect of the present invention comprises: input image capturing means for capturing an input image consisting of an original image and a removal image which is superimposed upon the original image and should be removed, the input image having pixels each of which has a pixel value as an addition value obtained through addition between a value, which is obtained by multiplying a pixel value of each pixel of the original image by t, and a value, which is a pixel value of each pixel of the removal image and is obtained by multiplying a superimposed pixel value by a value obtained by subtracting t from 1, where t is a transmittance in the range of 1 to 0 corresponding to each pixel; superimposed pixel value calculation means for calculating the superimposed pixel value on the basis of the input image; effect estimation value calculation means for calculating an effect estimation value which is a value obtained by estimating a degree of effect of the removal image on each pixel of the input image on the basis of the input image and the superimposed pixel value, which indicates that the degree of effect becomes larger as the value becomes closer to a predetermined boundary value between a minimum value and a maximum value from a first limit value as a limit value of one of the minimum value and the maximum value, and which is associated in advance with a value of the transmittance t; and correction processing means for generating a corrected image in which the effect of the removal image is reduced from the input image by correcting a pixel value of each pixel of the input image on the basis of the input image, the effect estimation value, and the superimposed pixel value. The correction processing means is means for performing the correction with an amount of correction based on the transmittance t associated as a value, which decreases from 1 to 0, on each pixel of which the effect estimation value ranges from the first limit value to the boundary value, and performing correction, by which an amount of correction becomes less than the amount of correction of a pixel value in a case where at least the transmittance t is set to 0, on each pixel of which the effect estimation value ranges from the boundary value to the other second limit value different from the first limit value of the minimum value and the maximum value.

According to this aspect, for each pixel of which the effect estimation value for estimating the degree of effect of the removal image on the input image indicates a value in the range from the boundary value to the second limit value, it is determined that the degree of effect of the removal image is not correctly estimated on the basis of the high-luminance subject which is not the removal image, and thus the amount of correction is suppressed. Therefore, it is possible to prevent loss of detail of a high-luminance subject.

In the image processing device according to another aspect of the present invention, the transmittance t may be associated with the effect estimation value in the range from the first limit value to the boundary value through a linear function that monotonically decreases from 1 to 0.

In the image processing device according to another aspect of the present invention, the transmittance t may be set as a value which monotonically decreases as a curve convex upward, and may be associated with the effect estimation value in the range from the first limit value to the boundary value.

In the image processing device according to another aspect of the present invention, the correction processing means may perform the correction on each pixel, of which the effect estimation value ranges from the boundary value to the second limit value, on the basis of the transmittance t associated in advance with the effect estimation value.

In the image processing device according to another aspect of the present invention, the transmittance t may be set as a value which increases from 0 to 1, and may be associated with the effect estimation value in the range from the boundary value to the second limit value.

In the image processing device according to another aspect of the present invention, the transmittance t may be set as a constant value which is greater than 0 and equal to or less than 1, and may be associated with the effect estimation value in the range from the boundary value to the second limit value.

In the image processing device according to another aspect of the present invention, the superimposed pixel value calculation means may be means for calculating, for each pixel, a difference value derived by a predetermined function in which a pixel value of each pixel in a differential image indicating a difference between a white image and the input image is set as a variable, acquiring, as a boundary difference value, a difference value in a case where the cumulative number of pixels accumulated in order from a pixel having a small difference value becomes a specific number which is predetermined, and calculating, as the superimposed pixel value, an average value of pixel values in the input image of pixels having the boundary difference value.

In the image processing device according to another aspect of the present invention, the pixel value of each pixel of the input image and the superimposed pixel value may consist of channel values of a plurality of channels in a color space, and the superimposed pixel value calculation means may be means for setting each pixel of the input image as a pixel of interest sequentially, and acquiring, as an evaluation value of the pixel which is set as the pixel of interest, a minimum value of the channel values of all the channels of all the pixels in a local region including the pixel of interest in the input image, acquiring, as a boundary evaluation value, an evaluation value in a case where the cumulative number of pixels accumulated in order from a pixel having a large evaluation value becomes a specific number which is predetermined, and calculating, as the superimposed pixel value, an average value of pixel values in the input image of pixels having the boundary evaluation value.

In the image processing device according to another aspect of the present invention, the pixel value of each pixel of the differential image may consist of channel values of a plurality of channels in a color space, and the superimposed pixel value calculation means may calculate, as the difference value, a value obtained by multiplying each channel value of the plurality of channels by a predetermined coefficient and adding the results of the multiplication.

In the image processing device according to another aspect of the present invention, assuming that, as the channel values of the plurality of channels of the differential image, a channel value of a luminance component is Y, a maximum value of the channel value of the luminance component is Ymax, a channel value of a blue color difference component is Cb, and a channel value of a red color difference component is Cr, and assuming that the coefficients are $\alpha$ and $\beta$, the superimposed pixel value calculation means may calculate the difference value by $\alpha(Ymax-Y)+\beta|Cb|+\beta|Cr|$.

In the image processing device according to another aspect of the present invention, the pixel value of each pixel of the input image and the superimposed pixel value may consist of channel values of a plurality of channels in a color space, the effect estimation value calculation means may set each pixel of the input image as a pixel of interest sequentially, and may calculate the effect estimation value of the pixel of interest, and the calculation of the effect estimation value of the pixel of interest may be calculating a dark channel value which is a minimum value of values obtained by dividing the channel values by the channel value of the same channel in the superimposed pixel value, for all channels of all pixels in a local region including the pixel of interest in the input image.

In the image processing device according to another aspect of the present invention, the pixel value of each pixel of the input image and the superimposed pixel value may consist of channel values of a luminance component, a blue color difference component, and a red color difference component in a color space, the effect estimation value calculation means may set each pixel of the input image as a pixel of interest sequentially, and may calculate the effect estimation value of the pixel of interest, the calculation of the effect estimation value of the pixel of interest may be calculating a maximum value of values obtained by dividing values, which are obtained by multiplying a difference value between a channel value of a luminance component and a maximum value of a channel value of a luminance component, an absolute value of a channel value of a blue color difference component, and an absolute value of a channel value of a red color difference component by predetermined coefficients respectively and adding the results of the multiplication for each of all pixels in a local region including the pixel of interest in the input image, by values which are obtained by multiplying a difference value between the channel value of the luminance component and a maximum value of the channel value of the luminance component, the absolute value of the channel value of the blue color difference component, and the absolute value of the channel value of the red color difference component of the superimposed pixel value by the predetermined coefficient and adding the results of the multiplication.

In the image processing device according to another aspect of the present invention, the boundary value of the effect estimation value may be 1.

In the image processing device according to another aspect of the present invention, the input image may be an image in which a removal image caused by atmospheric disturbance is superimposed on the original image.

In order to achieve the above-mentioned object, an image processing method according to another aspect of the present invention comprises: an input image capturing step of capturing an input image consisting of an original image and a removal image which is superimposed upon the original image and should be removed, the input image having pixels each of which has a pixel value as an addition value obtained through addition between a value, which is obtained by multiplying a pixel value of each pixel of the original image by t, and a value, which is a pixel value of each pixel of the removal image and is obtained by multiplying a superimposed pixel value by a value obtained by subtracting t from 1, where t is a transmittance in the range of 1 to 0 corresponding to each pixel; a superimposed pixel value calculation step of calculating the superimposed pixel value on the basis of the input image; an effect estimation value calculation step of calculating an effect estimation value which is a value obtained by estimating a degree of effect of the removal image to each pixel of the input image on the basis of the input image and the superimposed pixel value, which indicates that the degree of effect becomes larger as the value becomes closer to a predetermined boundary value between a minimum value and a maximum value from a first limit value as a limit value of one of the minimum value and the maximum value, and which is associated in advance with a value of the transmittance t; and a correction processing step of generating a corrected image in which the effect of the removal image is reduced from the input image by correcting a pixel value of each pixel of the input image on the basis of the input image, the effect estimation value, and the superimposed pixel value. The correction processing step is step of performing the correction with an amount of correction based on the transmittance t associated as a value, which decreases from 1 to 0, on each pixel of which the effect estimation value ranges from the first limit value to the boundary value, and performing correction, by which an amount of correction becomes less than the amount of correction of a pixel value in a case where at least the transmittance t is set to 0, on each pixel of which the effect estimation value ranges from the boundary value to the other second limit value different from the first limit value of the minimum value and the maximum value.

According to this aspect, for each pixel of which the effect estimation value for estimating the degree of effect of the removal image on the input image indicates a value in the range from the boundary value to the second limit value, it is determined that the degree of effect of the removal image is not correctly estimated on the basis of the high-luminance subject which is not the removal image, and thus the amount of correction is suppressed. Therefore, it is possible to prevent loss of detail of a high-luminance subject.

According to the present invention, it is possible to remove haze without losing detail of a high-luminance subject.

BRIEF DESCRIPTION OF THE DRAWINGS

FIG. 5 is an explanatory view illustrating a processing procedure in an atmospheric light pixel value calculation step.

FIG. 6 is a graph illustrating a correspondence relationship between the dark channel value and the transmittance in the first embodiment.

DESCRIPTION OF THE PREFERRED EMBODIMENTS

Hereinafter, preferred embodiments of the present invention will be described in detail with reference to the accompanying drawings.

Figure 1:
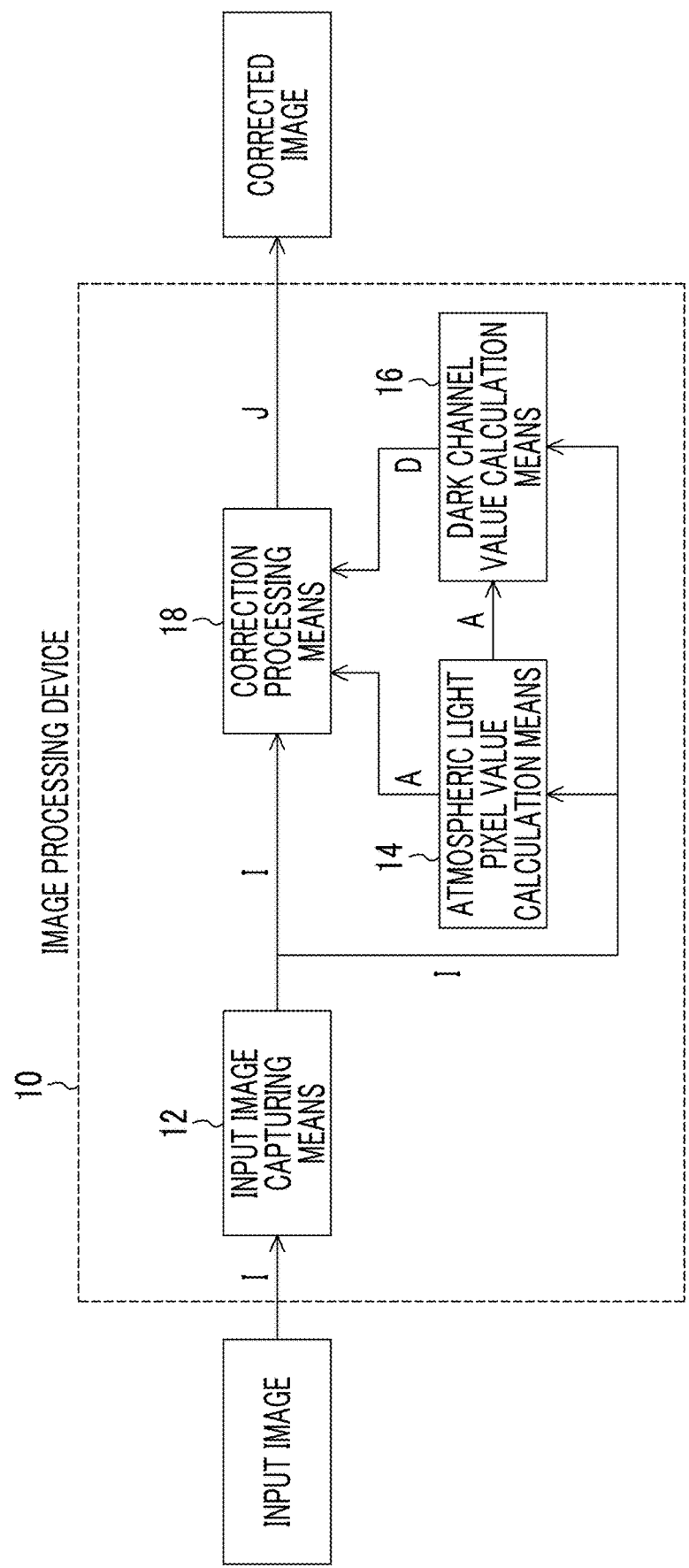
FIG. 1 is a configuration diagram of an image processing device according to the present invention.

FIG. 1 is a configuration diagram illustrating an image processing device according to the present invention. The image processing device 10 shown in the drawing is a device which captures an uncorrected image as an input image and outputs an image, which is obtained by removing haze such as mist or fog from the input image, as a corrected image. It should be noted that, in this specification, the removal of haze also includes reducing the effect of haze.

The image processing device 10 is mounted in an apparatus for acquiring an image by imaging means such as a digital still camera, a mobile phone with a camera function, a video camera, a surveillance camera, or a digital binocular, and captures the image, which is acquired by the imaging means, as an input image, and outputs a corrected image which is obtained by removing haze from the input image.

Further, the image processing device 10 may be a device incorporated in an apparatus that does not directly comprise the imaging means such as a personal computer, or may be a device that sets an arbitrary image, which is selected by a user or the like, as an input image and that outputs the corrected image which is obtained by removing haze from the input image.

As shown in FIG. 1, the image processing device 10 comprises: input image capturing means 12 for capturing an uncorrected image, which is a correction target, as an input image; atmospheric light pixel value calculation means 14 for calculating an atmospheric light pixel value on the basis of the input image; dark channel value calculation means 16 for calculating a dark channel value for each pixel of the input image on the basis of the input image and the atmospheric light pixel value; and correction processing means 18 for generating a corrected image, which is obtained by removing haze from the input image, on the basis of the input image, the dark channel value, and the atmospheric light pixel value.

Figure 2:
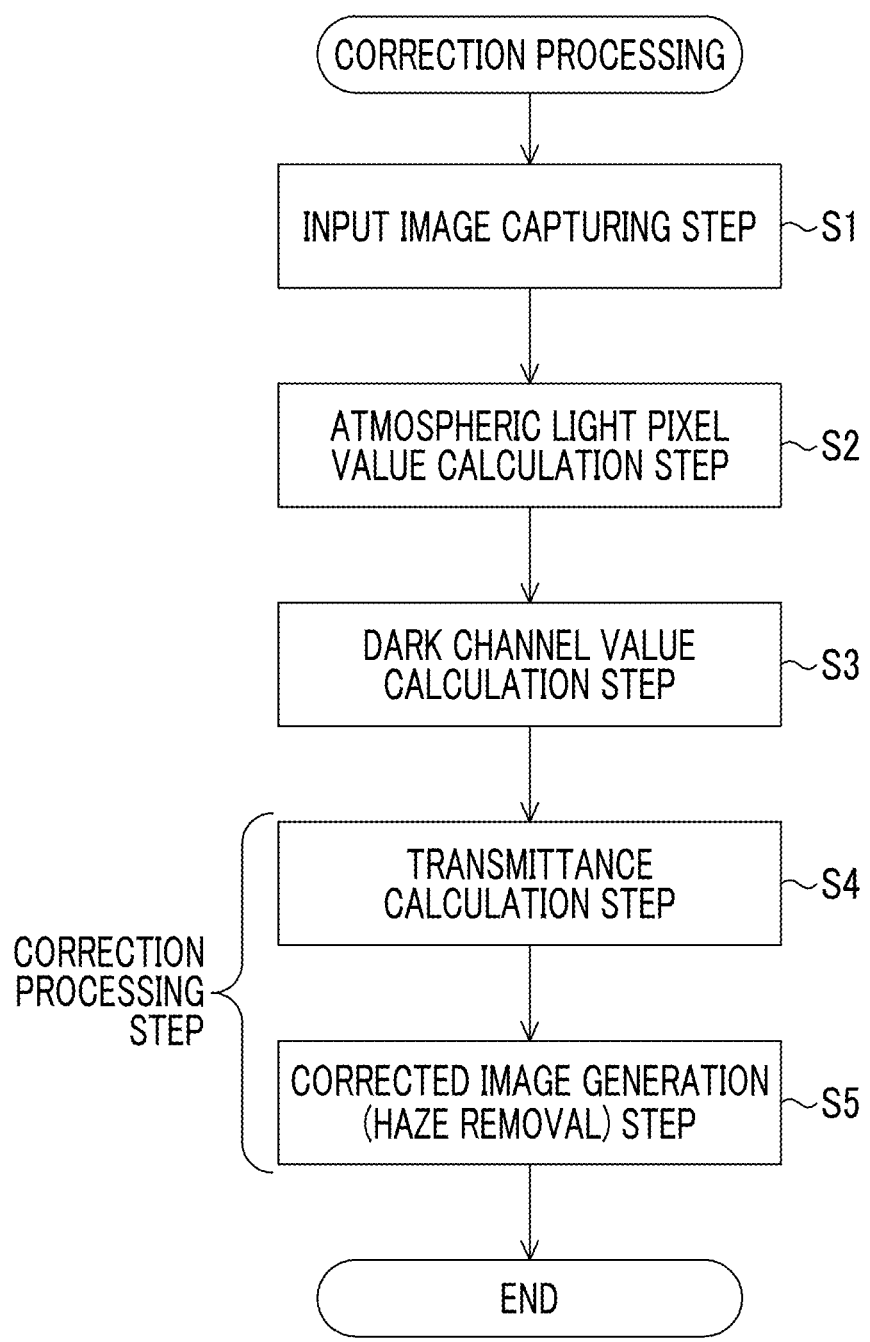
FIG. 2 is a flowchart illustrating an overall procedure (process) of an image correction method performed by the image processing device of FIG. 1.

FIG. 2 is a flowchart illustrating an overall processing procedure of the image correction method performed by the image processing device 10. The image correction method of the present embodiment consists of: an input image capturing step S1 of capturing an input image through the input image capturing means 12; an atmospheric light pixel value calculation step S2 of calculating an atmospheric light pixel value through the atmospheric light pixel value calculation means 14; a dark channel value calculation step S3 of calculating a dark channel value through the dark channel value calculation means 16; a transmittance calculation step S4 as a correction processing step of generating a corrected image through the correction processing means 18 and calculating a transmittance to be described later; and a corrected image generation step (haze removal step) S5 of removing haze from the input image.

Hereinafter, each means of FIG. 1 and each step of FIG. 2 will be described sequentially.

Figure 3:
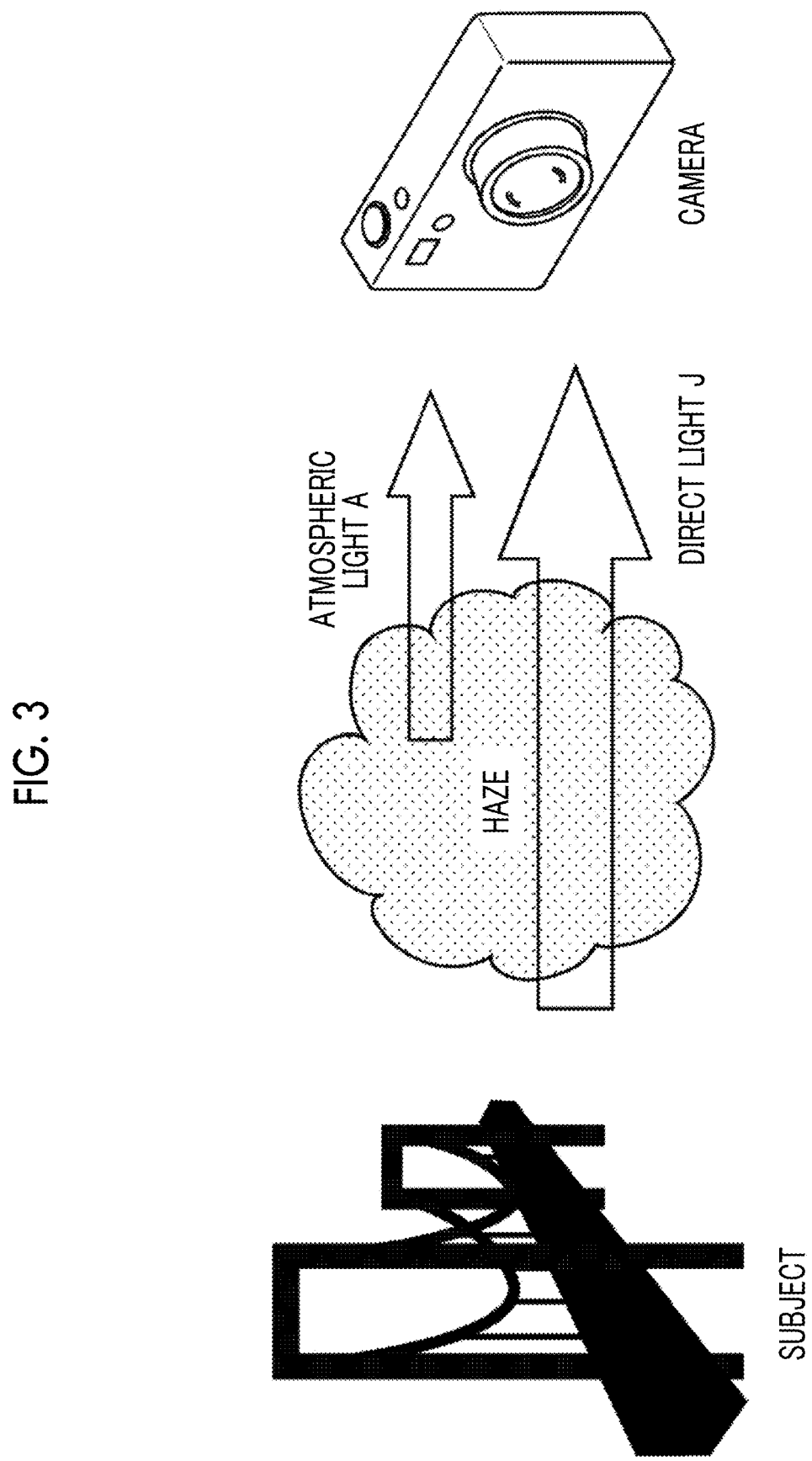
FIG. 3 is an image diagram at the time of capturing an image including haze.

The input image as a correction target to be captured by the input image capturing means 12 in the input image capturing step S1 is, for example as shown in the image diagram of FIG. 3, an outdoor image. In addition, the input image is an uncorrected image which includes haze and in which haze such as fog or mist is superimposed on an original image in which original colors of a subject as an imaging target are directly reflected, that is, an original image formed by direct light from a subject as an imaging target.

Here, x represents a variable such as position information (coordinates etc.) or an identification number for specifying one pixel of all the pixels in the image of one frame, a pixel value of a pixel x in the input image I as the uncorrected image is I(x), a pixel value of the pixel x in an original image J is J(x), a pixel value of the atmospheric light dispersed by haze (atmospheric light pixel value) is A, and a transmittance t of direct light of the pixel x is t(x). At this time, the pixel value I(x) of the pixel x of the input image I is represented by Expression (1).

$$I(x)=J(x) \cdot t(x)+A \cdot (1-t(x)) \quad (1)$$

Here, the transmittance t indicates a value in the range from 1 to 0 (a value in the range of 0 or more and 1 or less).

Therefore, by acquiring the atmospheric light pixel value A and the transmittance t(x) as described below, the original image J can be acquired as a corrected image which is acquired by removing haze.

In the image processing device 10 of the present embodiment, a color image having color information is set as an input image I as a processing target, pixel values such as the pixel value I(x) of the input image I, the pixel value J(x) of the original image J, or the atmospheric light pixel value A consist of a plurality of intensity values (hereinafter referred to as channel values) indicating the intensities of a plurality of color channels in the color space. Here, a monochrome image consisting of only luminance information may be set as the input image I. In this case, the pixel value is assumed to consist of only the intensity value (luminance value) of one color channel (luminance channel).

In the atmospheric light pixel value calculation step S2, the atmospheric light pixel value calculation means 14 calculates the atmospheric light pixel value A, which indicates the color (haze color) of the atmospheric light dispersed by haze as described above, on the basis of the input image I captured by the input image capturing means 12, through the atmospheric light pixel value calculation processing.

Figure 4:
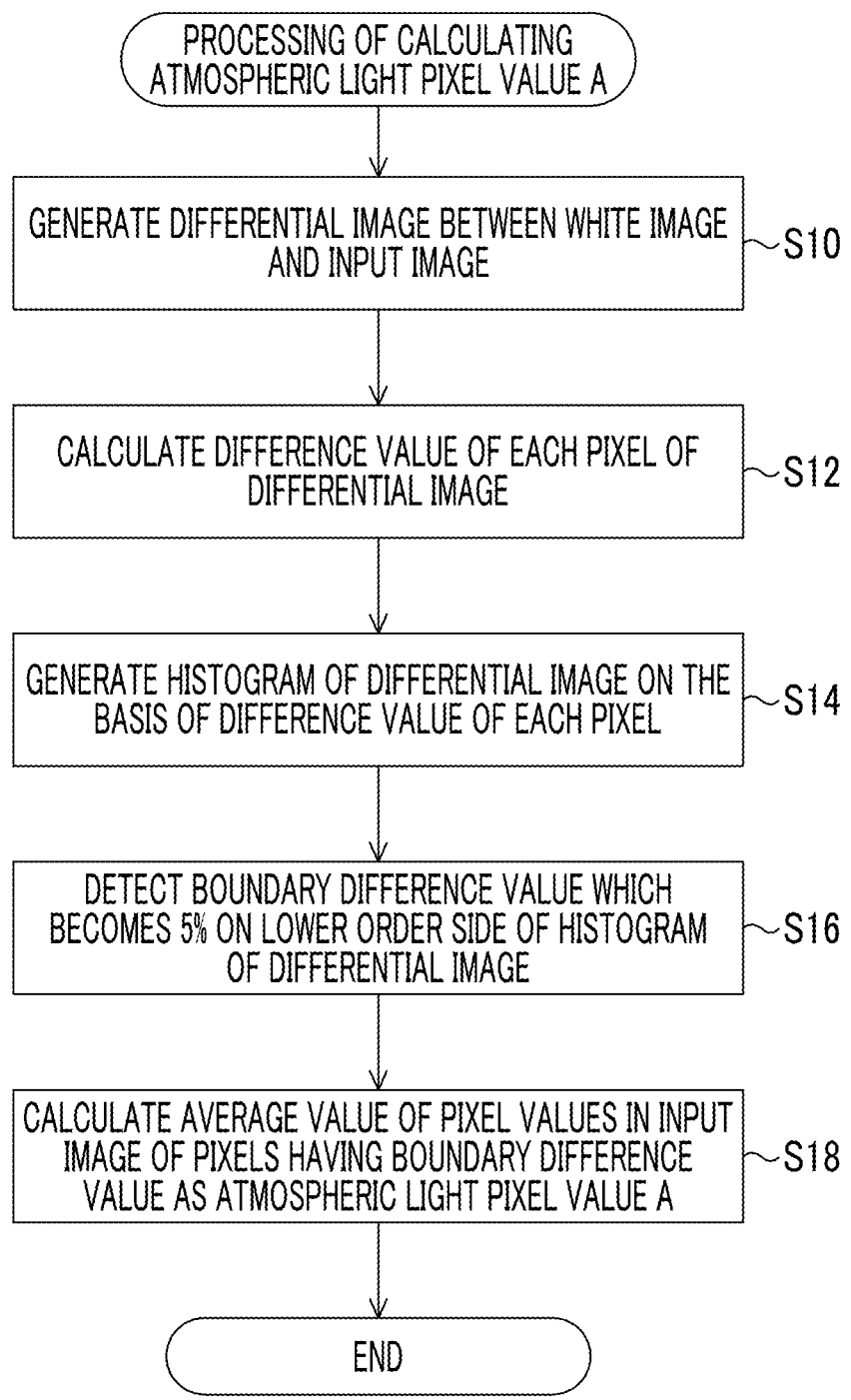
FIG. 4 is a flowchart illustrating a processing procedure in the atmospheric light pixel value calculation step.

Here, the processing procedure in the atmospheric light pixel value calculation step S2, that is, the processing procedure of the atmospheric light pixel value calculation processing in the atmospheric light pixel value calculation means 14 will be described with reference to the flowchart of FIG. 4 and the explanatory view of FIG. 5.

First, in step S10, a differential image S (refer to (C) of FIG. 5) between the white image W (refer to (A) of FIG. 5), in which the entire image is uniformly white, and the input image I (refer to (B) of FIG. 5) is generated. The differential image S is represented by Expression (2).

$$S(x)=W(x)-I(x) \quad (2)$$

Here, S(x), W(x), and I(x) indicate pixel values of the pixel x in the differential image S, the white image W, and the input image I, respectively.

Further, in the atmospheric light pixel value calculation processing, a YCbCr color space is used as a color space representing an image, and the pixel value is represented by three channel values respectively which indicates the intensities of the three color channels consisting of the luminance component, the blue color difference component, and the red color difference component.

For example, in a case where the channel value of the luminance component (luminance channel) is represented by a variable Y, the channel value of the blue color difference component (blue color difference channel) is represented by a variable Cb, and the channel value of the red color difference component (red color difference channel) is represented by a variable Cr, the pixel value consists of the channel values Y, Cb, and Cr, and components thereof are displayed as (Y, Cb, Cr).

Further, the pixel value in an arbitrary image is represented by P. The pixel values P of respective images of the white image W, the input image I, and the differential image S are represented by WP, IP, and SP. The channel values [Y, Cb, Cr] of the respective images W, I, and S are represented by [WY, WCb, WCr], [IY, ICb, ICr], and [SY, SCb, SCr].

It should be noted that the pixel value P, that is, the channel values Y, Cb, and Cr in each pixel x indicate a value for each pixel x, but those are represented as functions of x such as Y(x), Cb(x), and Cr(x) in order to clarify those. This also applies to representation of the pixel values and the channel values limited to each image of the white image W, the input image I, and the differential image S.

Therefore, in a case where the pixel value SP of each pixel of the differential image S in Expression (2) is represented by component representation, Expression (3) is obtained.

$$SP=(SY, SCb, SCr)=(WY-IY, WCb-ICb, WCr-ICr) \quad (3)$$

As for a specific example, it is assumed that the channel value of each color channel is expressed by 256 gradations of 8 bits, the channel value Y of the luminance channel takes a value in the range of [0, 255], and the channel values Cb and Cr of the blue color difference channel and the red color difference channel take values in the range [−128, 127].

At this time, the pixel value WP of each of all the pixels in the white image W is represented as follows.

$$WP=(WY, WCb, WCr)=(255, 0, 0)$$

Then, the pixel value IP of the predetermined pixel x in the input image I is represented as follows, for example.

$$SP=(SY, SCb, SCr)=(230, 110, 120)$$

In this case, the pixel value SP of the pixel x in the differential image S, that is, each channel value SY, SCb, SCr is calculated as follows by Expression (3).

$$SP=(SY, SCb, SCr)=(25, -110, -120)$$

Next, in step S12, the difference value SV of each pixel of the differential image S is calculated.

The difference value SV of each pixel is calculated by a function $\alpha \cdot (Y_{max}-Y)+\beta \cdot |Cb|+\gamma(Y_{max}-Y)+\gamma \cdot |Cr|$ of which coefficients are predetermined real numbers $\alpha$, $\beta$, and $\gamma$ in a case where channel values Y, Cb, and Cr of each pixel are set as variables. However, in the present embodiment, it is assumed that $\gamma=\beta$. $Y_{max}$ represents the maximum value of the luminance channel, which is 255 in the present embodiment.

Since the channel values Y, Cb, and Cr of each pixel in the differential image S are represented by SY, SCb, and SCr as described above, the difference value SV is calculated by Expression (4).

$$SV=\alpha \cdot (Y\max - SY) + \beta \cdot |SCb| + \beta \cdot |SCr| \quad (4)$$

Next, in step S14, a histogram of the differential image S is generated on the basis of the difference value SV of each pixel of the differential image S.

The histogram of the differential image S is a graph illustrating the number of pixels having the difference value SV on the horizontal axis and the difference value, which is indicated by the horizontal axis, on the vertical axis, as shown in (D) of FIG. 5.

Next, in step S16, in the histogram of the differential image S, a boundary difference value SVa, which is set such that the number of pixels accumulated from the smaller value side (lower order side) of the difference value SV is 5% of the total number of pixels in the differential image S, is detected.

That is, it is not indispensable to generate the histogram of the differential image S as in the step S14 as the processing of the step S14 and the step S16, and the difference value, which is obtained in a case where the cumulative number of the pixels accumulated in order from the pixels having the small difference value SV becomes a specific number K corresponding to 5% of the total number of pixel, is acquired as the boundary difference value SVa.

The specific number K is not necessarily 5% of the total number of pixels, but is preferably a number within a range of 1% or more and 7% or less of the total number of pixels.

Subsequently, in step S18, the average value of the pixel values IP in the input image I of the pixels having the boundary difference value SVa is calculated as the atmospheric light pixel value A. For example, in a case where the pixels on the line 30 in (E) of FIG. 5 have the boundary difference value SVa, by calculating the average value of the pixel values IP of the pixels on the line 30, the atmospheric light pixel value A in (F) of FIG. 5 is calculated.

Here, the average value of the pixel value IP means an average value of each component (channel value of each color channel) in the pixel value IP.

That is, assuming that the pixels having the boundary difference value SVa are x1 to xm (m is a positive integer), the pixel values IP(x1) to IP(xm) of the pixels x1 to xm in the input image I are represented as (IY(x1), ICb(x1), ICr(x1)) to (IY(xm), ICb(xm), ICr(xm)) by component representation using channel values of the respective color channels.

On the other hand, the atmospheric light pixel value A is represented as (AY, ACb, ACr) by component representation using channel values of the respective color channels.

At this time, the channel values AY, ACb, and ACr of the respective color channels of the atmospheric light pixel value A are respective average values of the channel values IY(x1) to IY(xm), ICb(x1) to ICb(xm), and ICr(x1) to ICr(xm) of the respective channels of the pixel values IP(x1) to IP(xm), and are calculated by Expressions (5) to (7).

$$AY = \left\{ \sum_{n=1}^{n} IY(xn) \right\} / m \quad (5)$$

$$ACb = \left\{ \sum_{n=1}^{n} ICb(xn) \right\} / m \quad (6)$$

$$ACr = \left\{ \sum_{n=1}^{n} ICr(xn) \right\} / m \quad (7)$$

As described above, the atmospheric light pixel value calculation means 14 of FIG. 1 calculates the atmospheric light pixel value A on the basis of the input image I.

In the dark channel value calculation step S3, through the dark channel value calculation processing, the dark channel value calculation means 16 calculates a dark channel value D, which is a value obtained by estimating the degree of effect of haze for each pixel of the input image I, for each pixel, on the basis of the input image I captured by the input image capturing means 12 and the atmospheric light pixel value A calculated by the atmospheric light pixel value calculation means 14.

Here, the dark channel value D indicates, for example, a value that increases as the degree of effect of haze increases, and indicates a value that is associated in advance with the value of the transmittance t of the direct light in Expression (1). That is, regardless of the pixel x, the dark channel value D and the transmittance t are associated in advance with each other by a certain relationship.

Therefore, by acquiring the dark channel value D of each pixel on the basis of the input image I and the atmospheric light pixel value A, it is possible to calculate the transmittance t of each pixel x as t(x) as described later.

In the processing of calculating the dark channel value D according to the present embodiment, it is assumed that the RGB color space is mainly used as a color space expressing the image, and it is assumed that the pixel values are represented by channel values of three color channels consisting of the red color component (R channel), the green color component (G channel) and the blue color component (B channel).

Here, it is possible to use a color space having an arbitrary form (mode) such as the YCbCr color space and the HSV color space other than the RGB color space. In addition, a variable having letters or values, which specifies the respective color channels in the color space having the arbitrary form, as specific values is indicated by c, and the pixel value I(x) of the pixel x of the input image I and the channel value of the color channel c at the atmospheric light pixel value A are indicated by Ic(x) and Ac.

For example, in the RGB color space, in a case where the R channel is indicated by r, the G channel is indicated by g, and the B channel is indicated by b, the variable c has [r, g, b] as specific values.

Here, in most of images without haze, particularly, outdoor images, a channel value of any of the respective color channels in at least one pixel in the local region is extremely small. Thus, it is estimated that the minimum value of the channel values of the respective color channels of the pixels in the local regions in the image including haze indicates the magnitude of the degree of effect of haze in each local region.

Therefore, the dark channel value calculation means 16 sequentially sets each pixel in the input image I as the pixel of interest, calculates the dark channel value D of the pixel of interest, and calculates the dark channel values D of all the pixels of the input image I.

Then, in the calculation of the dark channel value D of the pixel of interest, the minimum value of values, which are obtained by dividing the channel value Ic(y) by the channel value Ac of the same channel at the atmospheric light pixel value A, is calculated, for each of all the color channels of all the pixels y within the local region Ω(x) including the pixel x as the pixel of interest. The minimum value is set as a dark channel value D of the pixel x.

That is, in a case where the dark channel value D of the pixel x is D(x), D(x) is calculated by Expression (8).

$$D(x) = \min_C \left( \min_{y \in \Omega(x)} \left( \frac{Ic(y)}{Ac} \right) \right) \quad (8)$$

Here, $$\min_{y \in \Omega(x)}$$

means the minimum value in a case where the pixel y is sequentially changed to a pixel within the local region Ω(x), and $$\min_C$$

means the minimum value in a case where the color channel c is sequentially changed.

It is desirable that the local region Ω(x) is, for example, a region including a total of nine pixels surrounding the periphery of the pixel x as a center thereof, and a region having a size at which the degree of effect of haze is assumed to be substantially uniform.

In addition, instead of acquiring the dark channel values D(x) of all the pixels, one dark channel value D, which is a common value for each region consisting of a plurality of pixels, may be calculated.

In the transmittance calculation step S4 which is a part of the correction processing step, the correction processing means 18 acquires the transmittance t(x) of the direct light in Expression (1), on the basis of the dark channel value D(x) of each pixel of the input image I calculated by the dark channel value calculation means 16, through the transmittance calculation processing.

As described above, regardless of the pixel x, the dark channel value D and the transmittance t are associated in advance with each other by a certain relationship.

FIG. 6 is a graph illustrating the correspondence relationship between the dark channel value D and the transmittance t in the first embodiment.

In the drawing, the maximum value Dmax indicates a maximum value of the dark channel values D(x) of all the pixels in the input image I, and the dark channel value D indicates a value in the range of 0 or more and Dmax or less.

In a case where there is a subject having a higher luminance than that of haze, the dark channel value D may be greater than 1. At this time, the maximum value Dmax also has a value greater than 1.

On the other hand, the transmittance t is a value in the range of 0 or more and 1 or less.

Then, at a value in the range where the dark channel value D is equal to or greater than 0 and equal to or less than 1 (the range from 0 to 1), the dark channel value D and the transmittance t have the relationship of Expression (9), that is, the relationship of the straight line L1 in FIG. 6. Therefore, the transmittance t is acquired by Expression (9).

$$t = 1 - D \quad (9)$$

Here, for the pixels of which the dark channel values D range from 0 to the boundary value 1 in a case where the boundary value is set to 1, as the dark channel value D increases, that is, as the dark channel value D changes from 0 to the boundary value 1, the degree of effect of haze is estimated to increase. Therefore, as in Expression (9), the transmittance t is associated with the dark channel value D through a linear function that monotonically decreases from 1 to 0.

In contrast, at a value in a range where the dark channel value D is greater than 1 (the range from 1 to the maximum value Dmax), the dark channel value D and the transmittance t have the relationship of Expression (10), that is, the relationship of the straight line L2. Therefore, the transmittance t is acquired by Expression (10).

$$t = (D-1)/(D\text{max}-1) \quad (10)$$

Here, for a pixel of which the dark channel value D is a value in the range of greater than the boundary value 1, it is estimated that the degree of effect of the high-luminance subject on the dark channel value D is larger than the degree of effect of haze thereon. Hence, as in Expression (10), the transmittance t is associated as a value monotonically increasing with the dark channel value D.

The correction processing means 18 calculates the transmittance t(x) of direct light in each pixel, on the basis of the dark channel value D(x) of each pixel of the input image I, in accordance with a certain correspondence relationship between the dark channel value D and the transmittance t.

Then, in the corrected image generation step (haze removal step) S5 which is a part of the correction processing step, the correction processing means 18 generates an original image J as a corrected image in which haze is removed on the basis of the transmittance t(x) and the atmospheric light pixel value A of each pixel.

That is, from Expression (1), the pixel value J(x) of the pixel x of the original image J is represented by Expression (11).

$$J(x) = \{I(x) - A \cdot (1 - t(x))\}/t(x) \quad (11)$$
$$= A + (I(x) - A)/t(x)$$

In Expression (11), by substituting the pixel value I(x) of the input image I at the pixel x and the atmospheric light pixel value A into the right side, the pixel value J(x) of the pixel x in the original image J can be acquired. Then, by acquiring the pixel value J(x) of all pixels in the original image J, the original image J can be generated as a corrected image.

The correction processing means 18 outputs the corrected image, which is generated in such a manner, from the image processing device 10.

It should be noted that since the atmospheric light pixel value A and the transmittance t(x) calculated as described above are not necessarily accurate values, the corrected image obtained by Expression (11) does not necessarily coincide with the original image J.

Further, correction processing or the like of enhancing perspective by keeping the effect of haze instead of completely removing the haze from the input image I may be performed. For example, the value range of the transmittance t associated with the dark channel value D may be set as a part of a value range from 0 to 1, and may be set as a value range from S (0<S<1) to 1 or the like.

Therefore, the corrected image may be an image which is obtained by reducing the effect of haze in the input image I.

Figure 7C:
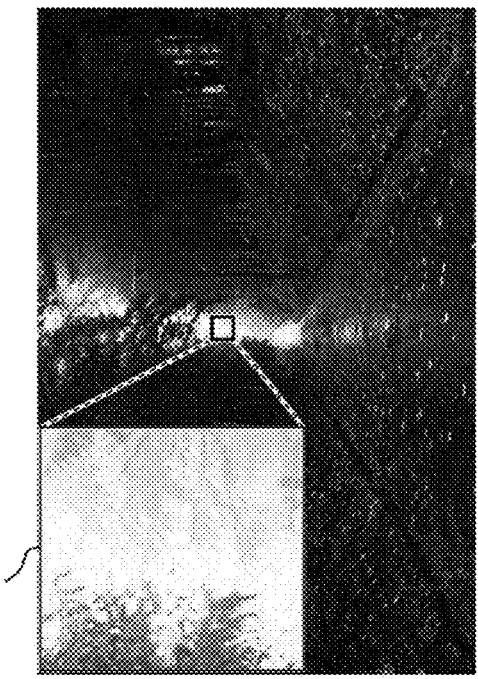
FIGS. 7A-7C are views illustrating the effect of the present invention.
Figure 7A:
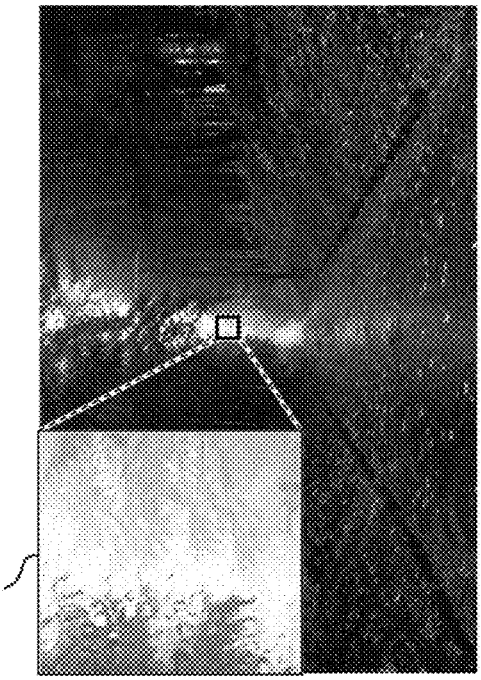
Figure 7B:
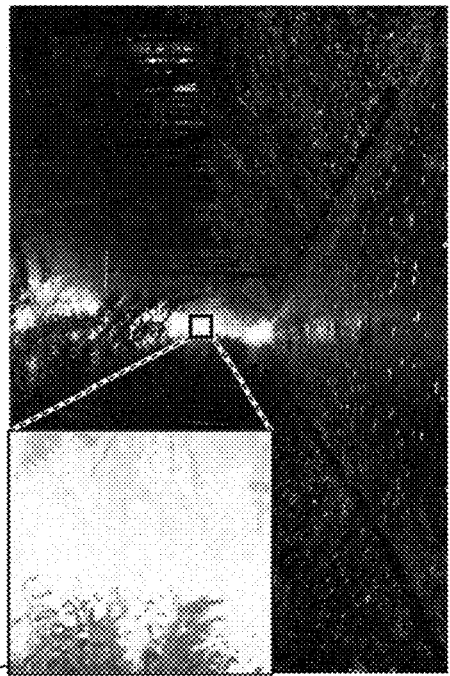

The effect of the above-mentioned image processing device 10 will be described. In FIG. 7, (A) of the drawing shows an example of the input image I, and the entirety thereof is whitish due to haze.

On the other hand, (B) of the drawing shows a corrected image which is obtained by removing haze through conventional correction processing, and (C) of the drawing shows a corrected image which is obtained by removing haze through the image processing device 10 of the present embodiment.

Comparing the corrected image of (B) of the drawing with the corrected image of (C) of the drawing, haze is removed as a whole from the input image I of (A) of the drawing, and the whiteness is removed.

On the other hand, in the enlargedly displayed region 40 of (A) of the drawing, images of sky with a high luminance and leaves with low transmittances are included.

Focusing on the image in the region 40, in the conventional correction processing, it is estimated that the pixel in the region 40 has a dark channel value D greater than 1 and the degree of effect of haze is large. Then, it is recognized that the transmittance t is extremely small, that is, the degree of effect of the original image J is extremely small.

As a result, the amount of correction in the increasing direction of the pixel value in the region 40 becomes extremely large. That is, as an index indicating a magnitude of the amount of correction of the pixel value, for example, the difference value Δd between the pixel value J(x) of the original image J as a corrected image and the pixel value I(x) of the input image I is calculated by Expression (11). Then, Δd=(I(x)−A)(1−t(x))/t(x). As can be seen from the difference value Δd, in a case where the transmittance t is extremely small, the difference value Δd is extremely large, and the amount of correction becomes extremely large.

Thereby, the pixel value in the region 40 is saturated, and the detail is lost like the image in the region 40 in (B) of the drawing.

In contrast, in the image processing device 10 of the present embodiment, even in a case where the dark channel value D is greater than 1, it is not necessarily recognized that the transmittance t is extremely small like the straight line L2 in FIG. 6. Therefore, an increase in the amount of correction of the pixel value in the region 40 is suppressed.

Thereby, the saturation of the pixel value in the region 40 is suppressed, and the detail remains as it is without loss as in the image in the region 40 in (C) of the drawing.

Next, another embodiment of the image processing device 10, in which the correspondence relationship between the dark channel value D and the transmittance t is different, will be described.

Figure 8:
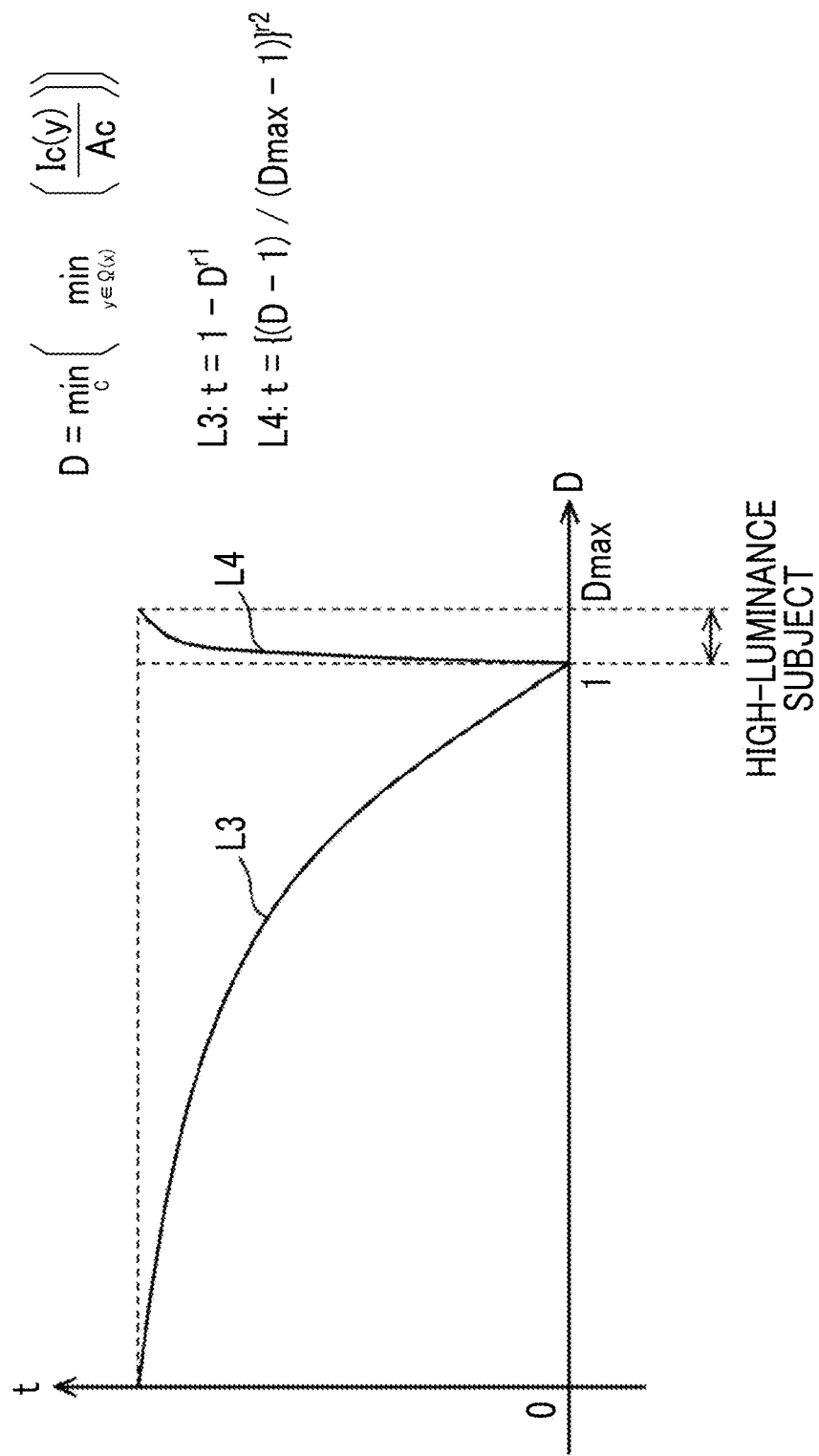
FIG. 8 is a graph illustrating a correspondence relationship between the dark channel value and the transmittance in the second embodiment.

FIG. 8 is a graph illustrating the correspondence relationship between the dark channel value D and the transmittance t in the second embodiment.

In the transmittance calculation processing, the correction processing means 18 is able to use the relationship of FIG. 8 instead of FIG. 6.

As shown in the drawing, in a case where the dark channel value D is a value in the range of 0 or more and 1 or less, the transmittance t is acquired by the relationship of Expression (12), that is, the relationship of the curve L3 in FIG. 8.

$$t = 1 - D^{r1} \quad (12)$$

Here, r1 is set to be less than 1.

In contrast, in a case where the dark channel value D is a value in the range of greater than 1, the transmittance t is acquired by the relationship of Expression (13), that is, the curve L4 in FIG. 8.

$$t = \{(D-1)/(D\mathrm{max}-1)\}^{r2} \quad (13)$$

Here, r2 is set to be greater than 1.

Here, in Expressions (12) and (13), it is desirable that r1 is a value less than 1 and r2 is a value of greater than 1, but r1 may be a value of 1 or more, and r2 may be a value of 1 or less.

Expressions (12) and (13) are examples. As an alternative function of Expression (12), any function may be used as long as it is a function in which the transmittance t monotonically decreases with respect to an increase in dark channel value D. As an alternative function of the Expression (13), any function may be used as long as it is a function in which the transmittance t monotonically increases with respect to an increase in dark channel value D. Further, as alternative functions of Expressions (12) and (13), it is desirable that each function is a function as a curve convex upward, that is, a function in which the second derivative of the transmittance t with respect to the dark channel value D has a negative value.

Further, the association between the dark channel value D and the transmittance t is not on the basis of a function, but may be association between concrete values like a look-up table.

Figure 9:
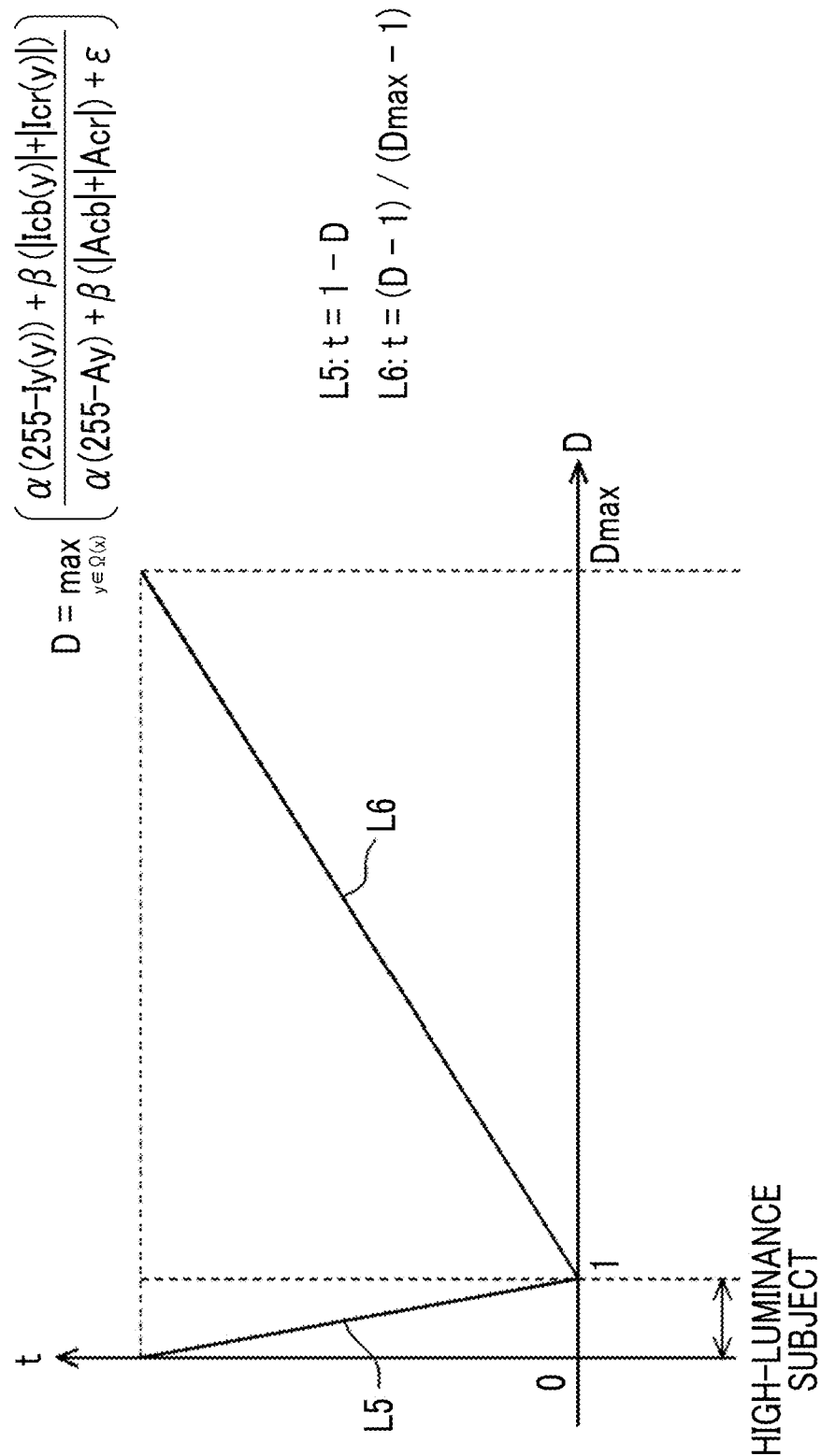
FIG. 9 is a graph illustrating a correspondence relationship between the dark channel value and the transmittance in the third embodiment.

FIG. 9 is a graph illustrating the correspondence relationship between the dark channel value D and the transmittance t in the third embodiment.

Here, the dark channel value D in the present embodiment is different from those in the first and second embodiments, and it does not correspond to the dark channel value in its original sense, but is referred to as a dark channel value in the present embodiment.

In the present embodiment, the dark channel value calculation means 16 calculates the dark channel value D(x) of the pixel x for each pixel by using Expression (14) through a dark channel value calculation processing.

$$D(x) = \min_{y \in \Omega(x)} \left( \frac{\alpha(255 - Iy(y)) + \beta(|Icb(y)| + |Icr(y)|)}{\alpha(255 - Ay) + \beta(|Acb| + |Acr|) + \varepsilon} \right). \quad (14)$$

Expression (14) is specialized in the case of using the YCbCr color space as the color space expressing the image. Ar, Acb, and Acr indicates channel values of the luminance channel, the blue color difference channel, and the red color difference channel at the atmospheric light pixel value A. Iy(y), Icb(y), and Icr(y) indicates channel values of the luminance channel, the blue color difference channel, and the red color difference channel at the y pixel of the input image I. α and β are coefficients, and ε is a constant for preventing division by 0.

That is, for each of all the pixels y in the local region Ω(x) including the pixel x as the pixel of interest, a value, which is obtained by multiplying the difference value between the channel value Iy(y) of the luminance channel and the maximum value 255 of the channel value of the luminance channel, the absolute value of the channel value Icb(y) of the blue color difference channel, and the absolute value of the channel value Icr(y) of the red color difference channel by predetermined coefficients and adding the results of the multiplication, is divided, by a value, which is obtained by multiplying the difference value between the channel value Ay of the luminance channel and the maximum value 255 of the channel value of the luminance channel, the absolute value of the channel value Acb of the blue color difference channel, and the absolute value of the channel value Acr of the red color difference channel at the atmospheric light pixel value A by predetermined coefficients and adding the results of the multiplication. The values obtained through the division are calculated, and the maximum value of the values is set as the dark channel value D of the pixel x.

Further, in Expression (14), it is assumed that, as the whiteness (degree) of a subject in the input image I increases, the degree of effect of haze increases. The maximum value, at which the value in the bracket on the right side becomes the largest, among the pixels in the local region Ω(x) including the pixel x as the pixel of interest is set as the dark channel value D(x).

In the transmittance calculation processing, the correction processing means 18 uses a relationship shown in FIG. 9 similar to that in FIG. 6.

As shown in the drawing, in a case where the dark channel value D is a value in the range of 0 or more and less than 1, as in Expression (9), the transmittance t is acquired by the relationship of Expression (15), that is, the curve L5 of FIG. 9.

$$t=1-D \qquad (15)$$

However, in the dark channel value D according to the present embodiment, for a pixel having a value in a range where the dark channel value is less than the boundary value 1, the dark channel value D is the degree of effect of the subject with higher luminance than the degree of effect of haze Is estimated to be large. Therefore, as shown in Expression (15), the transmittance t is associated as a value, which monotonically decreases, with the dark channel value D.

In contrast, in a case where the dark channel value D is a value in the range of 1 or more, as in Expression (10), the dark channel value D and the transmittance t have the relationship of Expression (16), that is, the relationship of the straight line L6 of FIG. 9. As a result, the transmittance t is acquired by Expression (16).

$$t=(D-1)/(D\max-1) \qquad (16)$$

Here, Dmax indicates the maximum value of the dark channel values D(x) of all the pixels in the input image I.

In the dark channel value D according to the present embodiment, for a pixel of which the dark channel value D is a value in the range from the boundary value 1 to the maximum value Dmax in a case where the boundary value is set to 1, it is estimated that, as the dark channel value D increases, the degree of effect of haze decreases. That is, it is estimated that, as the dark channel value D becomes closer to the boundary value 1 from Dmax, the degree of effect of haze becomes larger. Therefore, as in Expression (16), the transmittance t is associated as a value, which monotonically increases, with the dark channel value D.

Figure 10:
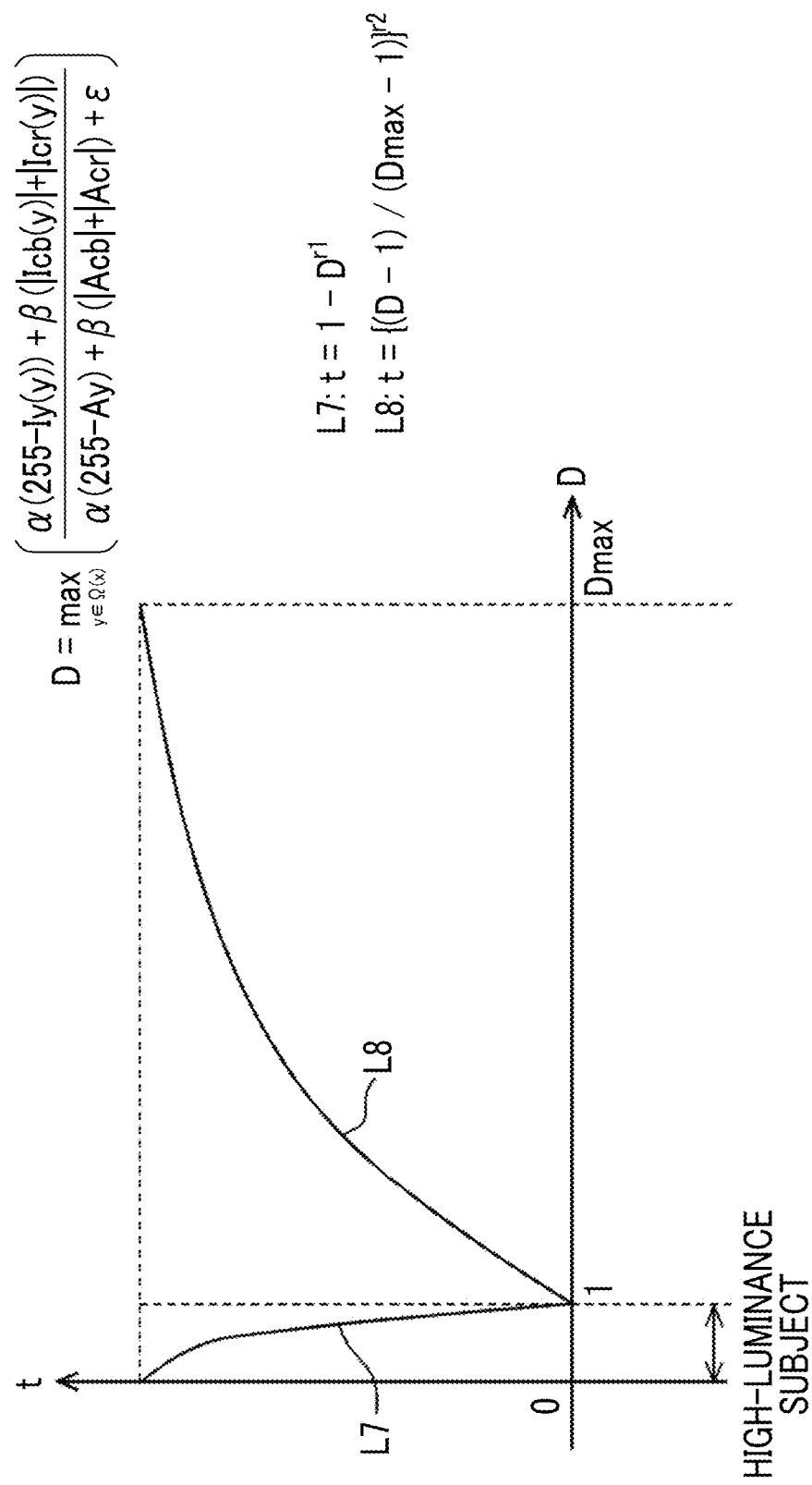
FIG. 10 is a graph illustrating a correspondence relationship between the dark channel value and the transmittance in the fourth embodiment.

FIG. 10 is a graph illustrating the correspondence relationship between the dark channel value D and the transmittance t in the fourth embodiment.

The dark channel value D is calculated through the same dark channel calculation processing similar to that of the third embodiment, and Expression (14) is used.

In the transmittance calculation processing, the correction processing means 18 uses a relationship shown in FIG. 10 similar to that in FIG. 8.

As shown in the drawing, in a case where the dark channel value D is a value in the range of 0 or more and less than 1, as in Expression (12), the transmittance t is acquired by the relationship of Expression (17), that is, the relationship of the curve L7 of FIG. 10.

$$t=1-D^{r1} \qquad (17)$$

Here, r1 is set to be less than 1.

In contrast, in a case where the dark channel value D is a value in the range of 1 or more, as in Expression (13), the transmittance t is acquired by the relationship of Expression (18), that is, the relationship of the curve L8 in FIG. 10.

$$t=\{(D-1)/(D\max-1)\}^{r2} \qquad (18)$$

Here, r2 is set to be greater than 1.

As in Expressions (12) and (13), in Expressions (17) and (18), it is desirable that r1 is a value of less than 1 and r2 is a value of greater than 1. However, r1 may be a value of 1 or more, and r2 may be a value of 1 or less.

Expressions (17) and (18) are examples. As an alternative function of Expression (17), any function may be used as long as it is a function in which the transmittance t monotonically decreases with respect to an increase in dark channel value D. As an alternative function of the Expression (18), any function may be used as long as it is a function in which the transmittance t monotonically increases with respect to an increase in dark channel value D. Further, as alternative functions of Expressions (17) and (18), it is desirable that each function is a function as a curve convex upward, that is, a function in which the second derivative of the transmittance t with respect to the dark channel value D has a negative value.

Further, the association between the dark channel value D and the transmittance t is not on the basis of a function, but may be association between concrete values like a look-up table.

In the first to fourth embodiments described above, the relationship between the dark channel value D and the transmittance t shown in FIG. 6, FIG. 8, FIG. 9, and FIG. 10 may be a relationship in which the amount of correction is less than the amount of correction of the pixel value as compared with a case where at least the transmittance t is 0, in a specific range of the dark channel value D in which it is estimated that the degree of effect of the high-luminance subject is larger than the degree of effect of haze, that is, a range of greater than 1 in FIGS. 6 and 8, a range of less than 1 in FIGS. 9 and 10.

Figure 11:
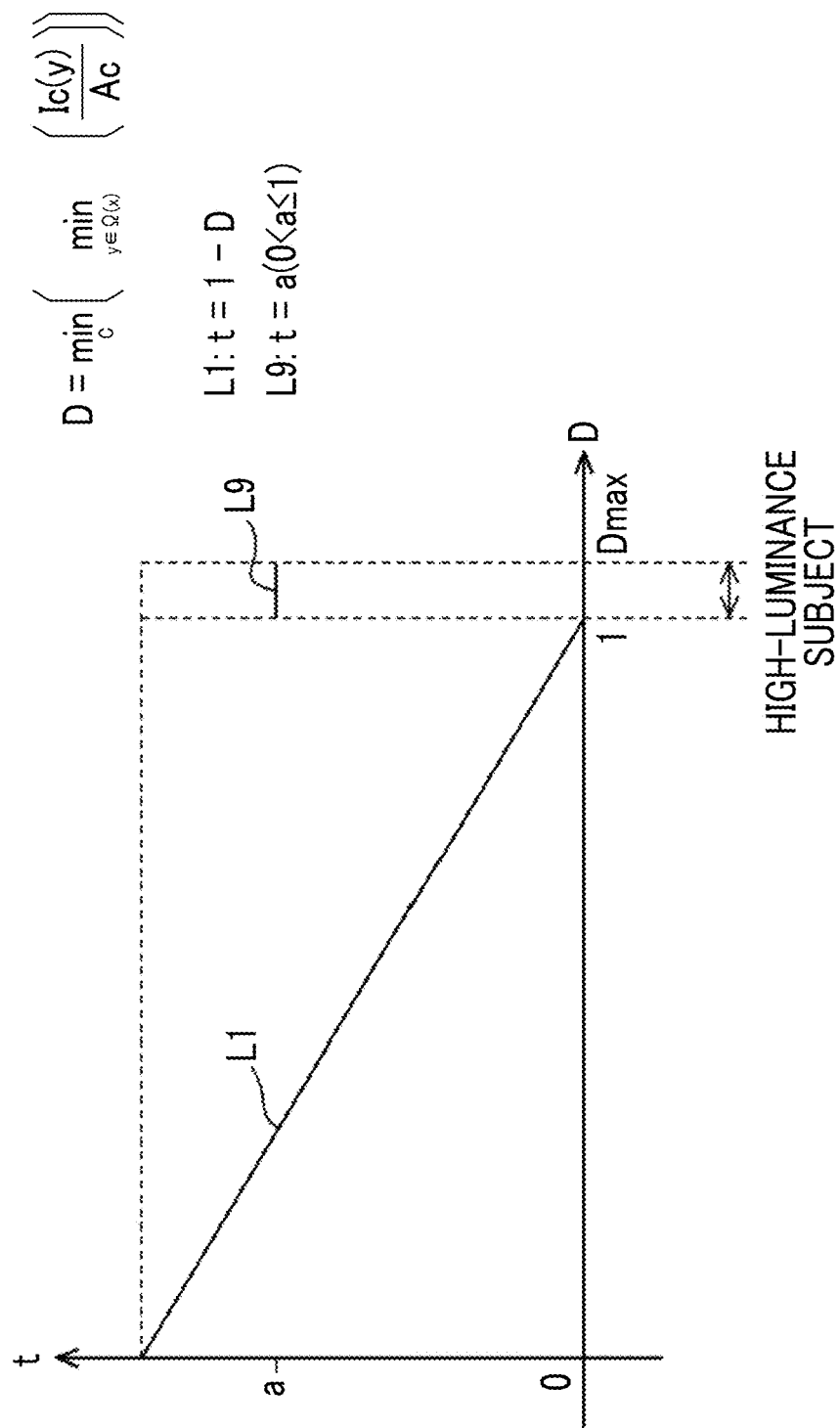
FIG. 11 is a graph illustrating a correspondence relationship between the dark channel value and the transmittance, where a part of FIG. 6 is changed.

For example, as shown in FIG. 11 in which a modification is applied to a part of FIG. 6, in a case where the dark channel value D is a value in the range of greater than 1 (the range of 1 to the maximum value Dmax), the transmittance t may be associated as a constant value a of greater than 0 and 1 or less like the straight line L9.

In addition, instead of setting the transmittance t as the constant value a, any method may be used as long as it reduces the effect of correction on the pixels in the specific range of the dark channel value D, and a method of performing no correction processing can be used.

As described above, the atmospheric light pixel value calculation means 14 in the above-mentioned embodiment is able to adopt an arbitrary method as the atmospheric light pixel value calculation processing. For example, the atmospheric light pixel value A may be calculated by the following method. In a case where each pixel of the input image I is sequentially set as a pixel of interest, the minimum value of the channel values of all the color channels of all the pixels in the local region including the pixel of interest in the input image I is acquired as an evaluation value of the pixel which is set as the pixel of interest. Subsequently, an evaluation value in a case where the cumulative number of pixels accumulated in order from a pixel having a large evaluation value becomes a specific number which is predetermined is acquired as a boundary evaluation value. Then, the average value of the pixel values in the input image I of the pixels having the boundary evaluation value is calculated as the atmospheric light pixel value A.

Further, in the above-mentioned embodiment, the dark channel value D calculated by the dark channel value calculation means 16 is not limited to a value calculated by a specific method.

That is, the dark channel value calculation means 16 is not limited to means for calculating the dark channel value D of the above-mentioned embodiment. Any means may be used as long as the means calculates a value obtained by estimating the degree of effect of haze on each pixel of the input image I on the basis of the input image I and the atmospheric light pixel value A through the effect estimated value calculation means, an effect estimation value which indicates that the degree of effect becomes larger as the value becomes closer to the predetermined boundary value between the minimum value and the maximum value from the first limit value which is a limit value of one of the minimum value and the maximum value, and an effect estimation value associated in advance with a value of the transmittance t. The effect estimation value may be applied as the dark channel value D of the above-mentioned embodiment. The boundary value indicates a value estimated to have the maximum degree of effect.

Here, 0, Dmax, and 1 in the dark channel values D used in the first and second embodiments and shown in FIGS. 6 and 8 correspond to the minimum value, the maximum value, and the boundary value of the effect estimation value. 0 of 0 and Dmax, which are the limit values of the dark channel value D, corresponds to the first limit value of the effect estimation value, and Dmax corresponds to the other limit value (the second limit value).

In addition, 0, Dmax, and 1 in the dark channel values D used in the third and fourth embodiments and shown in FIGS. 9 and 10 correspond to the minimum value, the maximum value, and the boundary value of the effect estimation value. Dmax of 0 and Dmax, which are the limit values of the dark channel value D, correspond to the first limit value of the effect estimation value, and 0 corresponds to the other limit value (the second limit value).

The correction processing means 18 of all of the first to fourth embodiments performs correction on each pixel, of which the effect estimation value ranges from the first limit value to the boundary value, on the basis of the transmittance t associated as a value which decreases from 1 to 0, and performs correction, by which the amount of correction becomes less than the amount of correction of a pixel value in a case where at least the transmittance t is set to 0, on each pixel of which the effect estimation value ranges from the boundary value to the second limit value.

In the correction processing means 18 of all of the first to fourth embodiments, the transmittance t is associated as a value, which increases from 0 to 1, with the effect estimation value in the range from the boundary value to the second limit value. In FIG. 11, the transmittance t is associated as a constant value, which is greater than 0 and is equal to or less than 1, with the effect estimation value in the range from the boundary value to the second limit value.

In the above-mentioned embodiment, the input image I as a correction target is an image in which haze such as mist is superimposed on the original image formed by direct light from the subject, but the present invention is not limited to this. For example, in a case where an image caused by atmospheric disturbance or an arbitrary image not included in the original image such as lens flare is superimposed on the original image, such an image is set as the input image I, and an image not included in the original image is set as a removal image to be removed. Thereby, it is possible to remove the removal image from the input image I (reduce the effect of the removal image) in a manner similar to that of the removal of haze in the above-mentioned embodiment.

At this time, in a case where the atmospheric light pixel value A is set as a superimposed pixel value A, the input image I is represented by Expression (1). Thus, the atmospheric light pixel value calculation means 14 serves as the superimposed pixel value calculation means, and is able to calculate the superimposed pixel value A in a manner similar to that of atmospheric light pixel value A.

EXPLANATION OF REFERENCES

10: image processing device
12: input image capturing means
14: atmospheric light pixel value calculation means
16: dark channel value calculation means
18: correction processing means
I: input image
x: pixel
J: original image
t: transmittance
A: atmospheric light pixel value

What is claimed is:

1. An image processing device comprising:
input image capturing means for capturing an input image consisting of an original image and a removal image which is superimposed upon the original image and should be removed, the input image having pixels each of which has a pixel value as an addition value obtained through addition between a value, which is obtained by multiplying a pixel value of each pixel of the original image by t, and a value, which is a pixel value of each pixel of the removal image and is obtained by multiplying a superimposed pixel value by a value obtained by subtracting t from 1, where t is a transmittance in the range of 1 to 0 corresponding to each pixel;
superimposed pixel value calculation means for calculating the superimposed pixel value on the basis of the input image;
effect estimation value calculation means for calculating an effect estimation value which is a value obtained by estimating a degree of effect of the removal image on each pixel of the input image on the basis of the input image and the superimposed pixel value, which indicates that the degree of effect becomes larger as the value becomes closer to a predetermined boundary value between a minimum value and a maximum value from a first limit value as a limit value of one of the minimum value and the maximum value, and which is associated in advance with a value of the transmittance t; and
correction processing means for generating a corrected image in which the effect of the removal image is reduced from the input image by correcting a pixel value of each pixel of the input image on the basis of the input image, the effect estimation value, and the superimposed pixel value,
wherein the correction processing means is means for performing the correction with an amount of correction based on the transmittance t associated as a value, which decreases from 1 to 0, on each pixel of which the effect estimation value ranges from the first limit value to the boundary value, and performing correction, by which an amount of correction becomes less than the amount of correction of a pixel value in a case where at least the transmittance t is set to 0, on each pixel of which the effect estimation value ranges from the boundary value to the other second limit value different from the first limit value of the minimum value and the maximum value.

2. The image processing device according to claim 1, wherein the transmittance t is associated with the effect estimation value in the range from the first limit value to the boundary value through a linear function that monotonically decreases from 1 to 0.

3. The image processing device according to claim 1, wherein the transmittance t is set as a value which monotonically decreases as a curve convex upward, and is associated with the effect estimation value in the range from the first limit value to the boundary value.

4. The image processing device according to claim 1, wherein the correction processing means performs the correction on each pixel, of which the effect estimation value ranges from the boundary value to the second limit value, on the basis of the transmittance t associated in advance with the effect estimation value.

5. The image processing device according to claim 4, wherein the transmittance t is set as a value which increases from 0 to 1, and is associated with the effect estimation value in the range from the boundary value to the second limit value.

6. The image processing device according to claim 4, wherein the transmittance t is set as a constant value which is greater than 0 and equal to or less than 1, and is associated with the effect estimation value in the range from the boundary value to the second limit value.

7. The image processing device according to claim 1, wherein the superimposed pixel value calculation means is means for calculating, for each pixel, a difference value derived by a predetermined function in which a pixel value of each pixel in a differential image indicating a difference between a white image and the input image is set as a variable, acquiring, as a boundary difference value, a difference value in a case where the cumulative number of pixels accumulated in order from a pixel having a small difference value becomes a specific number which is predetermined, and calculating, as the superimposed pixel value, an average value of pixel values in the input image of pixels having the boundary difference value.

8. The image processing device according to claim 7, wherein the pixel value of each pixel of the differential image consists of channel values of a plurality of channels in a color space, and wherein the superimposed pixel value calculation means calculates, as the difference value, a value obtained by multiplying each channel value of the plurality of channels by a predetermined coefficient and adding the results of the multiplication.

9. The image processing device according to claim 8, wherein assuming that, as the channel values of the plurality of channels of the differential image, a channel value of a luminance component is Y, a maximum value of the channel value of the luminance component is Ymax, a channel value of a blue color difference component is Cb, and a channel value of a red color difference component is Cr, and assuming that the coefficients are $\alpha$ and $\beta$, the superimposed pixel value calculation means calculates the difference value by $\alpha(Ymax-Y)+\beta|Cb|+\beta|Cr|$.

10. The image processing device according to claim 1, wherein the pixel value of each pixel of the input image and the superimposed pixel value consist of channel values of a plurality of channels in a color space, and wherein the superimposed pixel value calculation means is means for setting each pixel of the input image as a pixel of interest sequentially, and acquiring, as an evaluation value of the pixel which is set as the pixel of interest, a minimum value of the channel values of all the channels of all the pixels in a local region including the pixel of interest in the input image, acquiring, as a boundary evaluation value, an evaluation value in a case where the cumulative number of pixels accumulated in order from a pixel having a large evaluation value becomes a specific number which is predetermined, and calculating, as the superimposed pixel value, an average value of pixel values in the input image of pixels having the boundary evaluation value.

11. The image processing device according to claim 1, wherein the pixel value of each pixel of the input image and the superimposed pixel value consist of channel values of a plurality of channels in a color space, wherein the effect estimation value calculation means sets each pixel of the input image as a pixel of interest sequentially, and calculates the effect estimation value of the pixel of interest, and wherein the calculation of the effect estimation value of the pixel of interest is calculating a dark channel value which is a minimum value of values obtained by dividing the channel values by the channel value of the same channel in the superimposed pixel value, for all channels of all pixels in a local region including the pixel of interest in the input image.

12. The image processing device according to claim 11, wherein the boundary value of the effect estimation value is 1.

13. The image processing device according to claim 1, wherein the pixel value of each pixel of the input image and the superimposed pixel value consist of channel values of a luminance component, a blue color difference component, and a red color difference component in a color space, wherein the effect estimation value calculation means sets each pixel of the input image as a pixel of interest sequentially, and calculates the effect estimation value of the pixel of interest, wherein the calculation of the effect estimation value of the pixel of interest is calculating a maximum value of values obtained by dividing values, which are obtained by multiplying a difference value between a channel value of a luminance component and a maximum value of a channel value of a luminance component, an absolute value of a channel value of a blue color difference component, and an absolute value of a channel value of a red color difference component by predetermined coefficients respectively and adding the results of the multiplication for each of all pixels in a local region including the pixel of interest in the input image, by values which are obtained by multiplying a difference value between the channel value of the luminance component and a maximum value of the channel value of the luminance component, the absolute value of the channel value of the blue color difference component, and the absolute value of the channel value of the red color difference component of the superimposed pixel value by the predetermined coefficient and adding the results of the multiplication.

14. The image processing device according to claim 1, wherein the input image is an image in which a removal image caused by atmospheric disturbance is superimposed on the original image.

15. An image processing method comprising:
   an input image capturing step of capturing an input image consisting of an original image and a removal image which is superimposed upon the original image and should be removed, the input image having pixels each of which has a pixel value as an addition value obtained through addition between a value, which is obtained by multiplying a pixel value of each pixel of the original image by t, and a value, which is a pixel value of each pixel of the removal image and is obtained by multiplying a superimposed pixel value by a value obtained by subtracting t from 1, where t is a transmittance in the range of 1 to 0 corresponding to each pixel;
   a superimposed pixel value calculation step of calculating the superimposed pixel value on the basis of the input image;
   an effect estimation value calculation step of calculating an effect estimation value which is a value obtained by estimating a degree of effect of the removal image on each pixel of the input image on the basis of the input image and the superimposed pixel value, which indicates that the degree of effect becomes larger as the value becomes closer to a predetermined boundary value between a minimum value and a maximum value from a first limit value as a limit value of one of the minimum value and the maximum value, and which is associated in advance with a value of the transmittance t; and
   a correction processing step of generating a corrected image in which the effect of the removal image is reduced from the input image by correcting a pixel value of each pixel of the input image on the basis of the input image, the effect estimation value, and the superimposed pixel value,
   wherein the correction processing step is step of
      performing the correction with an amount of correction based on the transmittance t associated as a value, which decreases from 1 to 0, on each pixel of which the effect estimation value ranges from the first limit value to the boundary value, and
      performing correction, by which an amount of correction becomes less than the amount of correction of a pixel value in a case where at least the transmittance t is set to 0, on each pixel of which the effect estimation value ranges from the boundary value to the other second limit value different from the first limit value of the minimum value and the maximum value.

* * * * *